No. 785,427. PATENTED MAR. 21, 1905.
C. A. MANKER.
HYDROMOBILE.
APPLICATION FILED FEB. 24, 1902.
4 SHEETS—SHEET 1.
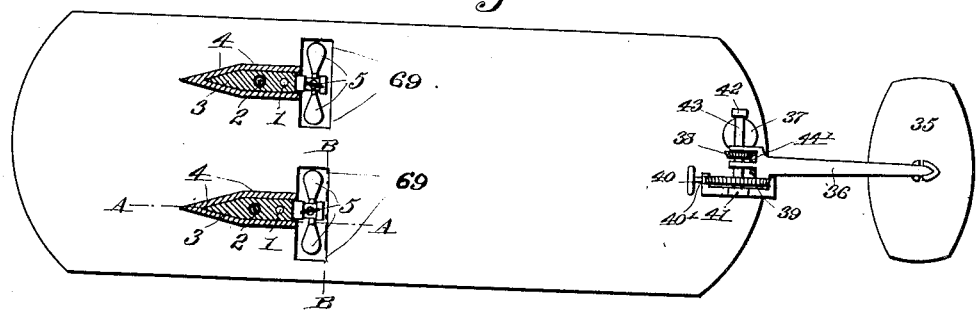
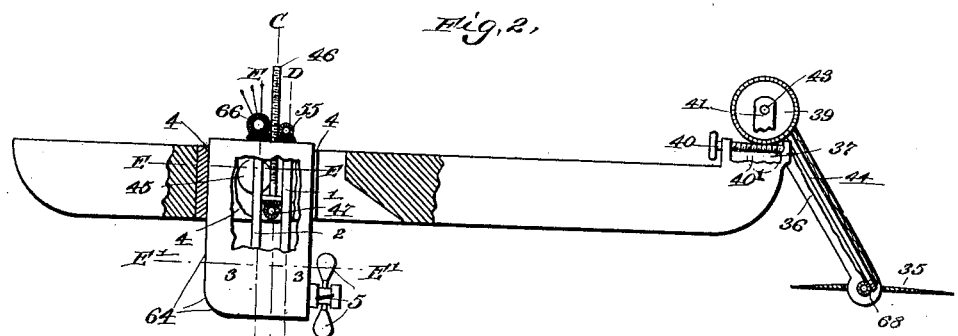
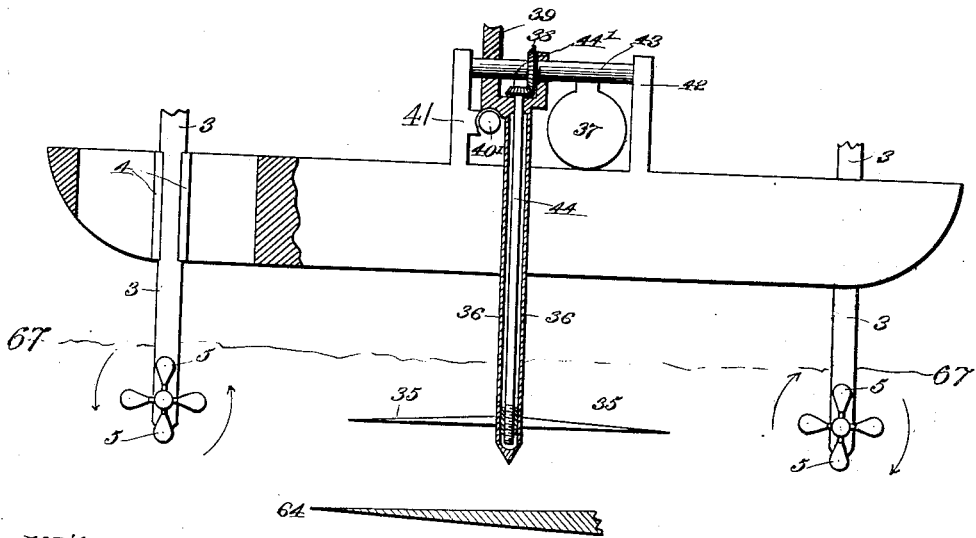
Witnesses
W. R. Donohoo
George Lucas
Inventor:
Carey Alan Manker

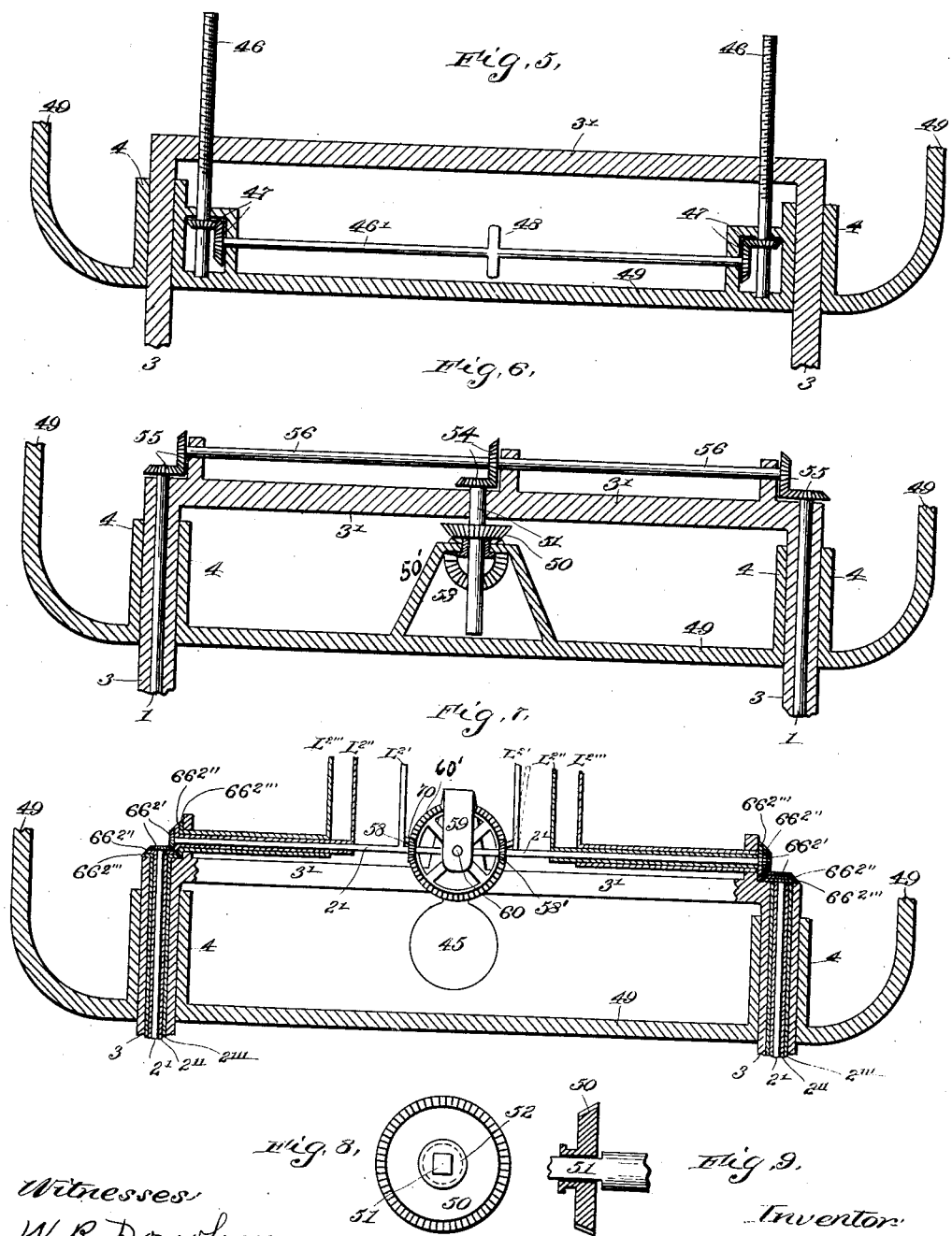

No. 785,427. PATENTED MAR. 21, 1905.
C. A. MANKER.
HYDROMOBILE.
APPLICATION FILED FEB. 24, 1902.
4 SHEETS—SHEET 3.
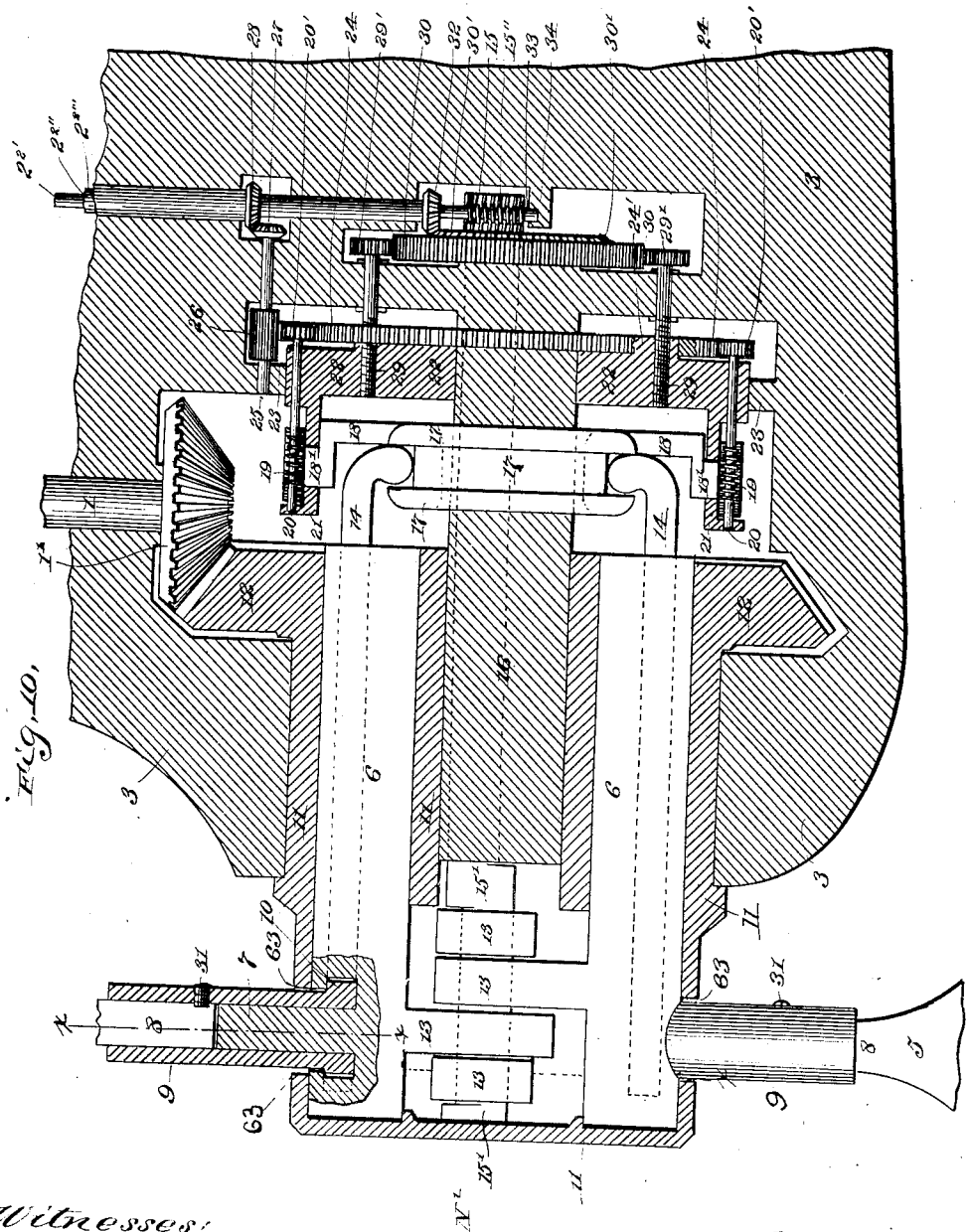
Witnesses:
W. R. Donohov
George Lucas
Inventor:
Carey Alan Manker

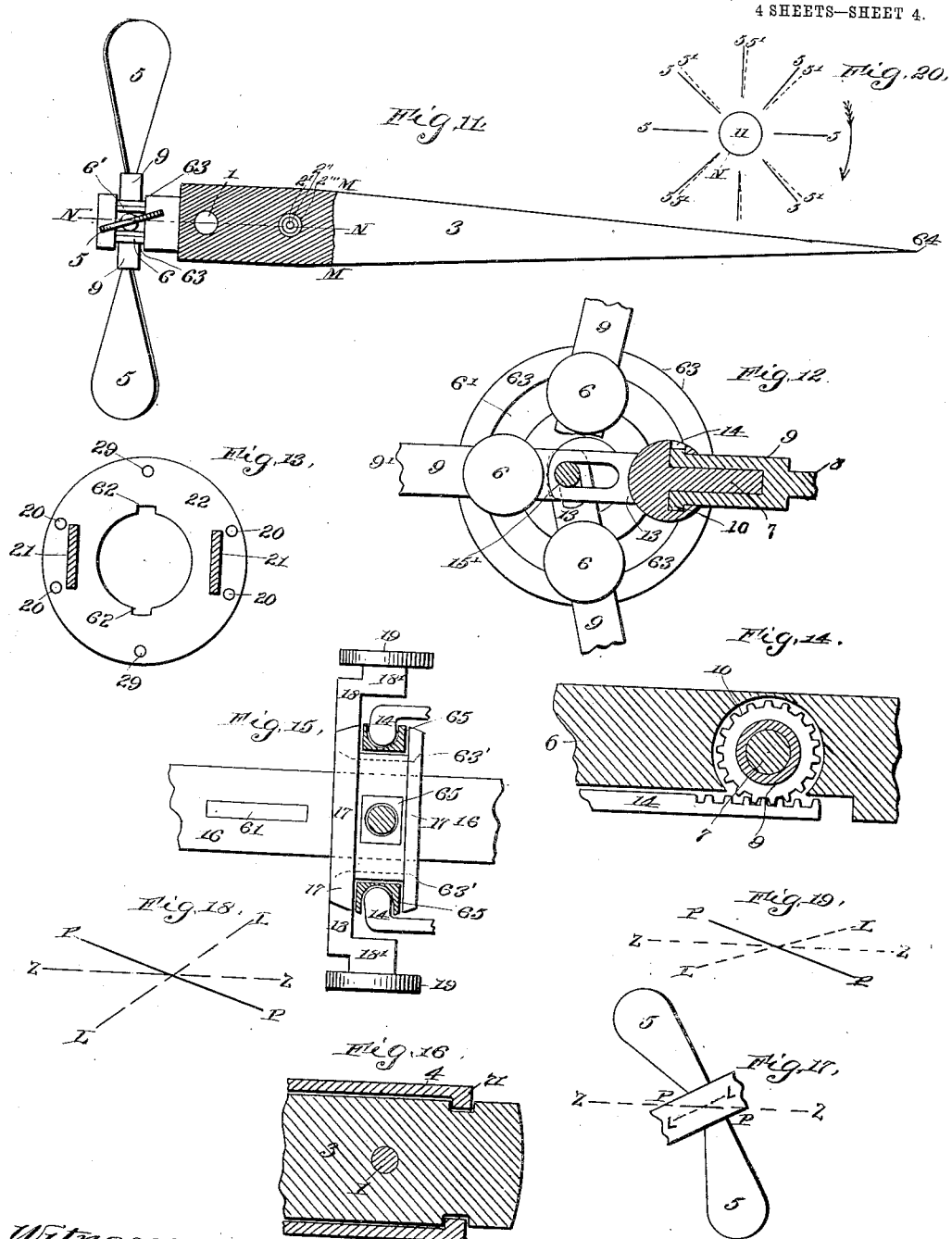

No. 785,427.

Patented March 21, 1905.

UNITED STATES PATENT OFFICE.

CAREY ALAN MANKER, OF PEARL, ILLINOIS, ASSIGNOR TO MANKER-HEAVNER NAVIGATION COMPANY, OF ST. LOUIS, MISSOURI, A CORPORATION OF ARIZONA TERRITORY.

HYDROMOBILE.

SPECIFICATION forming part of Letters Patent No. 785,427, dated March 21, 1905.

Application filed February 24, 1902. Serial No. 95,335.

*To all whom it may concern:*

Be it known that I, CAREY ALAN MANKER, a citizen of the United States, residing at Pearl, in the county of Pike and State of Illinois, have invented certain new and useful Improvements in Hydromobiles, of which the following is a full, clear, and exact description, reference being had to the accompanying drawings, forming part of this specification.

The object of this invention is to provide a swift and practical means of water navigation, also of aerial navigation.

The nature of my invention involves the use of downwardly and upwardly moving plates or blades acting in such manner as to exert a simultaneous buoyant or sustaining effect and a propelling effect both while the plates or blades are descending and while they are ascending. It also involves means for operating said plates in the water for hoisting and lowering the propeller, of which said plates are a part, giving the propeller a position to suit height of waves, so the boat may ride above them or may be lowered to suit smooth water, or the propellers may be drawn up into the body of the boat in shallow water or harbor when boat is allowed to float. It also involves means to keep the boat erect and free from turning over, which it could not help from doing except for such means to prevent this result. Also and consequently the means involved not only propels the boat horizontally, but actually lifts the boat above the water and the waves, thereby eliminating displacement and resistance of the water, whereby a much greater speed is secured, because the inertia of the water is no longer a resistance-factor to the body of the boat, there remaining in the water nothing but the propellers, their connections to the body of the boat, the means for keeping boat erect, and its connection to body of boat, all of which mechanical appliances gliding in the water present a knife-edge to direction of movement, thus to the highest efficient degree eliminating resistance from the water and allowing of speed unattainable under condition of a boat or ship displacing and constantly overcoming water, the inertia of which is nearly or as strong to arrest as is the power exerted to propel the craft or ship forward. I attain these objects by the mechanism illustrated in the accompanying drawings, in which—

Figure 1 is a plan or top view of a boat equipped with two compensating screw-propellers at and under a position a little forward of the middle cross-line and a leveling-plate at rear. This view shows a section taken on horizontal line E E of Fig. 2. Fig. 2 is a side view of boat, partly in section, taken on line A A, Fig. 1. Fig. 3 is a view of rear elevation of boat, partly in section, taken on line B B, Fig. 1, and shows water-line with propellers and leveling-plate beneath boat. Fig. 4 is a section taken transversely of one of the propeller-carrying runners, the leveling-plate edge, or one of the propeller-blades and illustrates the edge of any or all equipment portions acting in or against the water. Fig. 5 is a vertical cross-section taken on line C C, Fig. 2, and illustrates the hoisting apparatus. Fig. 6 is a vertical cross-section taken on line D D, Fig. 2, illustrating the power mechanism and showing how power is transmitted from power-wheel to propellers. Fig. 7 is a vertical cross-section taken on the vertical line E E, Fig. 2, illustrating mechanism by which variable velocities and pitch are imparted to the revolving propeller-blades of the compensating screw-propellers. Fig. 8 is a view showing in detail the cog-wheel from which power is received from the power-wheel. Fig. 9 is a section taken through the cog-wheel shown in Fig. 8, with the power-transmitting shaft positioned therein. Fig. 10 is a vertical longitudinal section taken on line N N, Fig. 11, the propeller-carrying runner being broken off on the line M M. Fig. 11 shows a horizontal section through one of the propeller-carrying runners, taken on line E' E', Fig. 2. Fig. 12 is a vertical section taken on lines X X of Fig. 10. Fig. 13 is a front view of the blade-adjusting disk and shows section of disk-arms. Fig. 14 is a longitudinal section through one of the cylinders that carry the propeller-blades. Fig. 15 is plan and section of modified stud 16 and shows pillows for dog-heads. Fig. 16 is a section of a modified form of the propeller-carrying runner and sheath. Fig. 17 is a view illustrating change of plane or horizontal pitch of blades of common propeller if its axis of revolution sets at an angle to horizontal plane. Fig. 18 diagrammatically illustrates change of pitch in downward and upward strokes of blades of compensating propeller. L L is ascending stroke and has greater horizontal angle than has P P in the descending stroke, which secures moderate speed. Fig. 19 is a diagrammatic view wherein P P has greater velocity and horizontal angle in descending than L L the ascending stroke, in which action is secured a pronounced propelling action and high speed with application of high power. Fig. 20 indicates acceleration and retardation of blades. The dotted lines represent position of blades if revolving as ordinary propeller-blades. The straight solid lines indicate how blades fall behind on one side and catch up on descending.

1 indicates a power-shaft through which rotary motion is imparted to the propellers from an engine or other suitable power appliance.

2 indicates three concentric shafts, (numbered individually 2', 2'', and 2''',) these shafts being the medium through which power is applied to mechanism connected to propellers to vary the velocity or angles, or both velocity and angles, of the propeller-blades singly or in unison during rotation of the propeller.

3 indicates runners by which the propellers are supported and carried, each runner containing mechanism through which the propellers are operated and the propeller-blades are shifted to obtain varying degrees of angle and velocity. The runners 3 are rigidly connected at their upper ends by a cross-beam 3'. (See Fig. 5.) 4 indicates sheaths in which the runners are positioned to move vertically.

5 indicates propeller-blades, which (see Fig. 10) are adapted to oscillate on pivots 7.

6 indicates oscillating cylinders fitted in channels contained by a revolving casing 11 and by which the blade-pivots 7 are carried.

8 indicates blade-stems, which may be integral with the socket-stems 9, that fit over the blade-pivots 7, (see Fig. 12,) or may be seated in said socket-stems, as seen in Fig. 10, to provide a slight oscillation and degree of resilience furnished by such arrangement, the blade-stem in the last-named instance being held to the socket-stem by a set-screw 31. On the inner end of each socket 9 is a cog-wheel 10, that is arranged in mesh with rack-teeth of a reciprocating rack-bar 14, loosely positioned in the corresponding oscillating cylinder 6, that receives said socket. The casing 11 is rotatably mounted in the runner 3 and carries at its inner end a beveled cog-wheel 12, that is arranged to operate in a chamber within the runner 3, in which the operating parts of the screw-propeller are also contained.

16 designates a stud fixed to the runner 3 and on which the casing 11 is rotatably mounted, so that said cog-wheel 12 may rotate around said stem when driven by a bevel-gear 1', carried by a power-shaft 1. (See Fig. 10.)

13 indicates link-arms fixed to the cylinders 6 and set spirally on said cylinders with reference to a common center or fulcrum N', each arm being linked over the crank 15' of a shaft 15. (See Figs. 10 and 12.)

14 indicates the reciprocating rack-bars, adapted to slide longitudinally in the cylinders 6 and having their heads seated in a grooved cam 17, whereby upon the movement of said cam, as hereinafter stated, movement may be imparted to the propeller-blades through the medium of the rack-teeth on said rack-bars that engage with the cog-wheels of the sockets 9.

The crank-shaft 15 is adapted to turn in an eccentrically-positioned channel in the stud 16, the positioning being such that upon rotation of said shaft the crank 15' may be caused to describe an arc horizontally through the fulcrum N', Fig. 10.

The cam 17 is loosely mounted on the stem 16, the orifice therein being greater in diameter than the diameter of said stud in order to permit rocking motion of the cam on the stud.

18 18' are arms carried by the cam 17, through means of which by gear mechanism the cam may be moved to occupy a position at an angle of ninety degrees or less to the axis of the stem 16. The arms 18' are loosely seated in arms 21 of a disk 22, loosely mounted on the stem 16, and on each arm 18' is a worm-gear 19, that is adapted to receive the engagement of the worm of a worm-screw rod 20, rotatably mounted in the disk 22 and corresponding arm 21.

20' is a pinion fixed to the worm-screw rod 20 and arranged in mesh with a cog-wheel 24, that is loosely mounted on the shoulder-bearing 24' at the rear of the disk 22. The disk 22 is supported by an annular rib 23, located in the chamber of the runner 3, and also by the tongue 61, that fits in a groove 62, (see Figs. 13 and 15,) which serves to prevent turning or twisting of the disk on the stem 16. On the rotation of the cog-wheel 24 movement is imparted to the worm-screw rods 20, and their movement communicates motion to the worm-gears 19 to rock the arms 18, and consequently the cam 17. On the rocking of the cam 17 it is set at a fixed angle farther forward on one horizontal side of the stem 16 than on the opposite side, with the result that on the rotative movement of the casing 11 through power applied thereto from the power-shaft 1 the rack-bars 14 are caused to be reciprocated in the cylinders 6 and the pitch or angles of the propeller-blades 5 are caused to vary on one horizontal side of the propeller from their position at the opposite side.

65 designates pillow-blocks seated in the groove of the cam 17 and adapted to receive the heads of the rack-bars 14 to provide sockets, in which the heads have limited play as the cam is shifted to and fro on the stem 16.

25 designates a shaft bearing a pinion 26, that meshes with the cog-wheel 24, through the medium of which said cog-wheel is rotated to operate the worm-screw rods 20. The shaft 25 is driven through the medium of a beveled pinion 27, that meshes with a beveled pinion 28, carried by the outer shaft 2''' of the three concentric shafts indicated by 2.

29 designates screw-rods rotatably mounted in the runner 3 and arranged to turn in screw-threads contained by the disk 22. Upon the rear ends of the screw-rods 29 are pinions 29', that mesh with a cog-wheel 30, loosely mounted on an extension at the rear of the stem 16.

30' is a beveled gear fixed to the cog-wheel 30, that has arranged in mesh with it a beveled pinion 32, that is carried by the central concentric shaft 2'' of those indicated collectively by 2. It will be seen that upon rotation of the shaft 2'' power is transmitted from said shaft through the gearing mentioned to rotate the screw-rods 29 and cause reciprocation of the disk 22 on the stud 16. By this movement the cam 17 is reciprocated on the stem 16 and acts to move the dogs 14 collectively to effect change of the angles of the screw-blades 5 to a common degree, or, in other words, to change the pitch of said blades in the same ratio. To recapitulate, the rotation of the shaft 2''' effects addition of the pitch on one horizontal side of propeller and diminishes it on the opposite side or varies the angles of the blades in different portions of revolution of the propeller. Rotation of the shaft 2'' causes change of the pitch of the blades by one common angle.

15'' indicates a worm fixed to the crank-shaft 15 at its rear end, that is arranged in mesh with a worm-screw 33 on the central shaft 2' of those collectively indicated by 2. It will be seen that upon the rotation of the shaft 2' power is imparted to the crank-shaft 15 to revolve said crank-shaft and move the crank 15' either to the center of the stem 16 or to a location eccentric to the axis of said stem. When the crank 15' is located eccentric to the axis of the stem 16, it occupies a position—for instance, as shown in Fig. 12—so that the fulcrum N' is changed from the geometric center, and if the stem of the propeller-blade at the point indicated by 9', Fig. 12, is descending it will proceed downward with a greater velocity than it will ascend on the opposite side or than the opposite stem and blade will rise, for the reason that the leverage from the crank 15' to the center of the cylinder 6 corresponding to the blade mentioned is shorter on the side indicated at 9' than on the opposite side, and therefore the blade is caused to travel with greater speed.

I prefer to make the blades of the propeller of wedge shape, as illustrated in Fig. 4, for the purpose of furnishing working surfaces thereof that will act supplementary to the means used for varying the angles or velocities of the blades. This supplemental action occasioned by the shape of the blades provides for less requisite movement of the blades in advancing them on their downward strokes and causing them to recede on the ascending strokes, as explained in bringing the working surfaces into action against the water to obtain the lifting action acquired by the propeller. It will be readily understood that by reason of the blades being of wedge shape the working surfaces of the blades are always presented to the water in such manner and in such angles with respect to the axis of the propeller-shaft that less movement of each blade in advancing and receding on the downward and upward strokes is necessary than would be required in the instance of blades of uniform thickness to obtain the same amount of service from them for the lifting or buoying effect which it is desired to obtain by the propeller.

34 is a shoulder upon which the lower end of the shaft 2' is supported for its bearing.

35 designates a leveling-plate (see Figs. 1, 2, and 3) journaled in the lower free end of the drag-pole 36, that is swingingly mounted upon the rear end of the boat. The leveling-plate 35 is adapted to be rotated in a vertical plane longitudinal to the boat, such rotation being obtained through the medium of a drive-rod 44, that is geared to a worm 68 on the shaft that carries said leveling-plate.

37 indicates a heavy weight that is suspended from a shaft 43, (see Fig. 3,) mounted horizontally in a frame 41 42. On the shaft 43 is a beveled pinion 38, that meshes with a beveled pinion 44', fixed to the shaft 44. The weight 37 is free to swing in a plane vertical and longitudinal to the boat and is adapted to operate in said plane whenever the rear portion of the boat rises or falls from the horizontal plane of the forward end of the boat, by which oscillation the shaft 44 is caused to revolve sufficiently to raise the front edge of the leveling-plate. By this arrangement in the forward travel of the boat the inclination of the leveling-plate is rendered such that it will find a higher or lower level, as the case may be, until it rides in a horizontal plane, when it will be found that the boat will ride smoothly and in the same horizontal plane from end to end. Thus the boat is prevented from tipping forward or backward and will move evenly both fore and aft.

39 designates a worm-wheel fixed to the shaft 43 and pole 36 and arranged in mesh with a worm-screw rod 40', bearing a hand-wheel 40. On rotation of the hand-wheel 40 the pole 36 may be raised and the leveling-plate be revolved out of the water for any desired purpose, or the parts may remain at rest for the leveling-plate to occupy a position at any desired depth in the water indicated, of which 67 indicates the water-line.

46 indicates hoisting-screws that operate in the cross-beam 3', which unites the runners 3. These hoisting-screws are geared by beveled pinions 47 to an operating-shaft 46', that is equipped with a hand-wheel 48. Rotation of the shaft 46' operates the hoisting-screws to raise and lower the runners 3, which carry the compensating propellers, so that through the medium of said propellers the boat may be raised to any desired height above the water-line while the boat is in motion, or the propellers may be raised and lowered in the water by such mechanism while the boat is at rest. The construction of these parts is such that the propellers may be elevated to any desired distance to carry them into the body of the boat or entirely on deck through the wells 69. The propellers may also be raised only sufficiently to cause their blades to occupy a position immediately below the bottom of the boat, so that they will be of service in propelling the boat in shallow water.

53 indicates a power-wheel from which power is transmitted to rotate the propellers through the medium of a beveled gear-wheel 50, a shaft 51, beveled gears 54, shaft 56, beveled gears 55, and shaft 1, the latter of which connects with and operates the propeller by imparting rotation to the casing 11, as hereinbefore set forth. The shaft 51, being mounted in the beam 3', partakes of the rise and fall of said beam, and therefore to maintain the gearing connection to said shaft 1 make its lower end non-circular to fit a corresponding aperture in the bevel-wheel 50, so that the shaft 51 will remain constantly in gear with said beveled wheel.

The series of triple concentric gears (collectively indicated at 66) are connected to triple concentric shafts 2', 2'', and 2''', united at their lower extremities to the propeller-actuating mechanism in the runner 3. At their upper extremities the shafts 2', 2'', and 2''' through the gears 66², 66²', 66²'' (see Fig. 7) and horizontal and right angle concentric shafts communicate power to the vertical shafts 2', 2'', and 2'''. The horizontal concentric shafts are provided with levers L², L²'', and L²''', by which the shafts may be rocked to vary the angles and velocities of the propeller-blades through the operation of the vertical shafts that impart motion to the mechanism operatively connected to the different parts, as hereinbefore set forth.

45 designates a heavy weight supported by a rock-shaft 60, the said weight being adapted to swing freely in a vertical transverse plane. On the rock-shaft 60 is a beveled cog-wheel 60', that meshes with beveled cog-wheels 57 and 58, the latter of which are fixed to the horizontal shaft 2'. In the event of the boat tipping sidewise the weight 45 is caused to swing to one side, and in so doing it rotates the cog-wheels 57, 58, and 58' and rod 2', by which motion is communicated to the propeller-blades to vary their angle and cause them to produce a greater buoying effect on the lower or tipping side of the boat and a less sustaining effect on the high side. If a tipping action becomes excessive, there is a degree of change communicated to the propeller-blades sufficient to cause those on the more elevated side of the boat to assume such angles as to pull the boat downward on such elevated side.

In the event of its being found necessary to adjust the rod 2' to vary the velocities of the propeller at one side from that of the propeller at the opposite side the lever L², fixed to said shaft, may be sprung to one side, as shown by dotted lines in Fig. 7, whereupon the stud 70 is released from the cog 58, with which it was previously in engagement, thereby freeing the rod 2' and permitting it to return without moving the cog-wheel 58 or without interference with the automatic weight 45. In case of a constant wind and the existence of waves coming from one side of the boat it is necessary to operate the parts mentioned to secure said variation. The resilience of the lever L² causes it to be moved back into its original position on the removal of the hand of the operator therefrom.

Fig. 16 shows a section of a modified form of the runner 3 and sheath 4. In this construction tongues 71, carried by the sheath 4, are made use of to fit in grooves in the runner 3, extending vertically of said runner. The object of this arrangement is to furnish a guide for the runner within its sheath and to protect the sharp edge of said runner in a manner that will obviate its wedging in the sheath.

Having described my invention, I will briefly set forth the mechanical application of the propeller-blades whereby a simultaneous buoying and propelling effect is obtained in its use. Place two common screw-propellers one behind the other in a channel of water, each propeller adapted to revolve in a plane transverse to channel. By revolving the forward propeller a motion is imparted to the water, whereby it flows through blades of second propeller, imparting a revolving motion thereto.

It is found that if the two propellers have same pitch the second does not turn quite so fast as the first; also, that the water impinges on opposite sides of the blades in second from in the first propeller.

Now my compensating propeller is designed so that in one phase of its action there is a slower action in ascending blades than in the descending blades, whereby the impinging of the water is received on the under side of the blades both in coming up as well as going down, by which a buoying effect is obtained, and the lateral pressure that has been lost in the common screw-propeller by counteraction outward from blades is resolved into an action in one direction, and that downward, the direction needed to buoy the boat. The velocity being enough greater downward than it is upward, and this downward action being of a tendency to slide forward, it overbalances the action of the ascending blade, which has a tendency to slide backward, and the result of this overbalancing is to propel forward in a ratio about in keeping with the power applied to vary velocities, which variation of velocity has been explained.

Again, if the second propeller have a shorter pitch it is found that it will turn as fast as the first propeller; but the impingement of the water is on opposite side of blades, as in first instance. This leads to a phase in my compensating propeller in which there is a variation of pitch of blades in the ascending as compared to the descending action. In this case there is also a buoyant effect, together with a propelling effect, depending on the amount of variation of pitch; but by a combination of the variable velocities and angles, either or both, a more perfect action is obtained from point of buoyancy and propulsion.

In the descending and in the ascending blades there is a more or less equal distribution of weight of the boat and load from the fulcrum on which the propeller turns, so that the weight is almost self-sustaining instead of having to furnish power to lift the boat.

On account of the variation of velocities or angles of blades in their ascending strokes as compared to their descending strokes there is a region in the upper and in the lower quarter of the circle of revolution of propeller in which the blades are neutral in their action, and consequently exert no lateral or propelling effect, the lateral effect, as before stated, being converted in a downward direction from the horizontal side blades, which while in this horizontal position exert a propelling effect as a resultant of power applied to propel, as described.

The blades 5 and the leveling-plate 35 are each adapted to oscillate on an axis located somewhat nearer the entering than the leaving edge thereof. The object of this is that when the boat is moving forward, at the same time being sustained by said blades and plate, there is a greater force of impingement on the rear half than the forward half of blades and plate. By having axis as stated the blades and plate are more equally balanced on their axes and submit more easily to being operated, the weight sustained cutting but little figure in power applied to operate on axis.

The description given of buoying and propelling effect is based on understanding of the boat possessing a forward motion, as is likewise description of action of leveling-plate.

The operation of the propellers will be understood from the following description, taken in connection with Figs. 17, 18, 19, and 20, which demonstrate the counter-leverage or counterpoise action of the propeller-blades.

In Fig. 17 I have illustrated the change of plane or horizontal pitch of the blades of a common propeller when its axis of revolution sets at an angle to a horizontal plane and from which the novel action of my compensating propeller-blades will be made more readily apparent.

Fig. 18 diagrammatically illustrates the change of pitch in the downward and upward strokes of the blades of my propeller, L L representing the ascending stroke and P P the descending stroke, the former having a greater horizontal angle than the latter, which secures moderate speed.

Fig. 19 shows diagrammatically wherein the descending stroke P P has greater velocity and horizontal angle than the ascending stroke L L, whereby greater propelling action and higher power and speed are secured.

Fig. 20 shows the accelerated and retarded action of the blades, the dotted lines 5' representing the position of blades when revolving as ordinary propeller-blades, while the straight solid lines 5 indicate how the blades fall behind on ascending and catch up on descending.

As heretofore described, the blades have three adjustments, as follows: first, one in which the rocking of cam 17 causes the pitch or angles of the blades 5 to vary on one horizontal side of the propeller from their position at the opposite side; second, one in which the reciprocation of cam 17 collectively changes the angles of the blades to a common pitch, or, in other words, changes the pitch of said blades in the same ratio, and, third, one in which the crank-shaft 15 is revolved to shift the fulcrum-point from the common center, so as to change the leverage of the blades. These adjustments are performed in this particular instance through the action of the three shafts 2', 2'', and 2''' and the gearing cooperating therewith, which has been specifically described herein; but other means of effecting these adjustments may be employed. The first two adjustments give differential power and speed, as will be readily understood, and I will now proceed to explain the counterpoise action secured by the third adjustment.

By reference to Figs. 1 and 16 it will be seen that the leverage of opposing blades is shorter on one side than on the other, the blade at 9' in Fig. 12, for instance, having less leverage than the diametrically-opposed blade, and that both of these blades are attached to a common central fulcrum and to outer secondary fulcrums, the latter formed by the cylinders 6, carried by the revoluble casing 11. If these opposing blades be each allowed to rest on a solid support, the weight borne by the fulcrum will be distributed to the blades and their respective supports. If one blade be lifted, the entire weight will be lifted by the blade acting as a lever on its two fulcrums to revolve the casing, whereby an equal pressure of weight is brought to bear on the opposing secondary fulcrum and blade and its support. Therefore, inasmuch as one blade will support a portion of the weight in counteraction to another portion of the weight supported by an opposing blade through a compensating leverage, the action is that of counterpoise. When this propeller is revolving in water, the central fulcrum is eccentric to such a degree only as will secure a slowing-up motion of the ascending blade, whereby the water is caused to impinge underneath and whereby a support is had, by which means there is offered what is equivalent to a solid support, as in the above example, both horizontal side blades being supported from beneath though continually revolving and carried forward on such supports, which, in effect, act as a solid road-bed. These supports are generated curves considered from a point of revolution of the blades and from a point of forward speed in line of propeller-axis, the descending blade gliding downward and forward on a forwardly-facing curve and the ascending blade gliding upward and forward on a rearwardly-facing curve, this on condition always of forward speed. By a more rapid revolution of propeller a greater pressure is applied to the downwardly and forwardly facing curve or incline and a relief of pressure is had against the upwardly and rearwardly facing curve or incline, when a greater speed is secured until the weight is again in equilibrium, as denoted by the equal pressure of the ascending and descending blades against their generated curves. This counterpoise varies, as denoted by varying pressures, and is equipoise only when the pressure of opposing sides are equal; but a counterpoise exists in all phases of revolution in a mobile medium, provided the boat is under speed.

When the pitch of the ascending blade is shorter than the pitch of the descending blade, the result is the same as a slowing up in the motion of the ascending blade under condition of uniform pitch, the water impinging beneath the ascending blade as well as beneath the descending blade, thus securing supports at both sides of the propeller to lift the weight to be sustained. In this case of uniform motion but varied pitch the leverage is not compound, as in the varied velocities of blades, but is simply leverage acting in counterpoise to lift, one blade counteracting another blade in relative rigidity thereto, but both acting on a central fulcrum, as one beam balanced midway between its extremities, to lift the weight borne by the fulcrum, while the extremities are active to turn and impinge against the water and be impinged against for supports to sustain the weight borne, this weight being distributed from the fulcrum to the two extremities as components of weight, each with reference to the other component weighed in balance, or, in other words, the two components of weight are in counterpoise or lifting counter-leverage each with the other. This counterpoise action causes the blades to exert a simultaneous buoyant or sustaining effect and a propelling effect both while the blades are ascending and descending, whereby the propellers not only propel the boat horizontally, but actually lift the body of the boat above the water and waves, thereby eliminating displacement and resistance of the water, whereby a much greater speed is secured, because the inertia of the water is no longer a resistance factor to the body of the boat, there remaining in the water nothing but the propellers, their connections to the body of the boat, the means for keeping the boat erect, and its connection to body of boat, all of which mechanical appliances gliding in the water present a knife-edge to direction of movement, thus to the highest efficient degree eliminating resistance from the water and allowing of speed unattainable under conditions of a boat or ship displacing and constantly overcoming water the inertia of which is nearly or as strong to arrest as is the power exerted to propel the craft or ship forward.

Having now briefly described the principal features of my invention, I claim—

1. The combination with a revoluble propeller-carrier, of means for rotating said carrier, a series of propeller-blades rockingly carried by said carrier, and means having connection with said blades and arranged to control their pitch in variation of each other, and to vary this variation.

2. The combination with a vessel, of a revoluble propeller-carrier, means for rotating said carrier, a series of propeller-blades rockingly carried by said carrier, and a movable cam whereby said blades are caused to be moved into a pitch on their descending strokes to serve as a medium to lift a component of the weight of the vessel, substantially as set forth.

3. The combination with a revoluble propeller-carrier, of means for revolving said carrier, a series of propeller-blades mounted in said carrier to swing in the line of rotation of the propeller, a movable cam, and means of connection between said cam and said blades whereby said blades are moved into varied angles with respect to the axis of said carrier on the movement of said cam, substantially as set forth.

4. The combination with a vessel, of a series of wedge-shaped propeller-blades mounted to swing in the line of rotation of the propeller, and fulcrum mechanism to which said blades are connected, and by which the blades are varyingly moved to support the weight of the vessel by counter-leverage.

5. The combination with a revoluble propeller-carrier, of means for revolving said carrier, oscillatory members mounted in said carrier, means for operating said oscillatory members, stems, sockets applied to said stems, propeller-blades having their stems seated in said sockets, and screws by which their stems are held, substantially as described.

6. The combination with a revoluble propeller-carrier, of means for revolving said carrier, a series of oscillatory members mounted in said carrier, propeller-blades loosely connected to said oscillatory members, means for oscillating said members to vary the movement of said propeller-blades at different periods during the rotation of said carrier, and means for feathering said blades during the rotation of the carrier, substantially as described.

7. The combination with a revoluble propeller-carrier, of means for revolving said carrier, oscillatory members mounted in said carrier, means for oscillating said members, propeller-blades loosely connected to said oscillatory members, reciprocating bars geared to said propeller-blades, a cam arranged to receive said reciprocating bars, and means for actuating said cam to move said bars for the purpose of feathering said propeller-blades, substantially as described.

8. The combination with a revoluble propeller-carrier, of means for revolving said carrier, oscillatory members mounted in said carrier, propeller-blades connected to said oscillatory members, rack-bars arranged in engagement with said propeller-blades, a cam, a support for said cam, and means whereby said cam is rocked on its support to reciprocate said rack-bars for the purpose of feathering said propeller-blades, substantially as described.

9. The combination with a revoluble propeller-carrier, of means for revolving said carrier, oscillatory members mounted in said carrier, propeller-blades connected to said oscillatory members, rack-bars arranged in engagement with said propeller-blades, a cam, a support for said cam, means whereby said cam is rocked on its support for the purpose of feathering said propeller-blades, and pillow-blocks seated in said cam and adapted to receive the rear ends of said rack-bars, substantially as described.

10. The combination with a vessel, of a drag-pole pivotally mounted at the stern of the vessel, an adjustable leveling-plate carried by said pole, substantially as described.

11. The combination with a vessel, of a drag-pole pivotally mounted at the stern of the vessel, a leveling-plate carried by said pole, and a weight carried by the pivot of said pole adapted to control the movement thereof, substantially as described.

12. The combination with a vessel, of a drag-pole pivotally mounted at the stern of the vessel, a leveling-plate swingingly mounted in the free end of said drag-pole, a shaft geared to said leveling-plate, and a weight suspended from the pivot of said pole and adapted to operate said pivot to impart rotation to said shaft, substantially as set forth.

13. The combination with a vessel, of runners adjustable vertically of the vessel, means for adjusting the runners in unison, propellers carried by said runners, means for driving and varyingly controlling the working force of the blades of each propeller, and means for independently governing the driving and controlling mechanism of each propeller, substantially as described.

14. The combination with a vessel, of a revoluble propeller-carrier, means for revolving said carrier, propeller-blades having their stems swingingly mounted in said carrier, a swinging weight mounted on the vessel, and mechanism actuated by said weight, whereby said blades are moved, to vary their angularity.

In testimony whereof I have signed my name to this specification, as well as to the drawings herewith, in the presence of two subscribing witnesses.

CAREY ALAN MANKER.

Witnesses:
  A. O. TATE,
  B. HEAVNER.